US012587019B2

(12) United States Patent
Manjrekar et al.

(10) Patent No.: US 12,587,019 B2
(45) Date of Patent: **\*Mar. 24, 2026**

(54) APPARATUS AND METHOD FOR CONTROLLING ONE OR MORE INVERTERS

(71) Applicant: THE UNIVERSITY OF NORTH CAROLINA AT CHARLOTTE, Charlotte, NC (US)

(72) Inventors: Madhav Manjrekar, Charlotte, NC (US); Prithwiraj Roy Chowdhury, Charlotte, NC (US)

(73) Assignee: THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/966,693

(22) Filed: Dec. 3, 2024

(65) Prior Publication Data

US 2025/0096578 A1 Mar. 20, 2025

Related U.S. Application Data

(63) Continuation of application No. 18/171,999, filed on Feb. 21, 2023, now Pat. No. 12,199,441.

(60) Provisional application No. 63/311,750, filed on Feb. 18, 2022.

(51) Int. Cl.
H02J 3/44 (2006.01)
H02J 3/18 (2006.01)

(52) U.S. Cl.
CPC .................................... *H02J 3/44* (2013.01); *H02J 3/18* (2013.01); *H02J 2203/20* (2020.01)

(58) Field of Classification Search
CPC ............ H02J 3/44; H02J 3/18; H02J 2203/20
See application file for complete search history.

(56) References Cited

U.S. PATENT DOCUMENTS

2024/0136947 A1 4/2024 Ayai

*Primary Examiner* — Robert L Deberadinis
(74) *Attorney, Agent, or Firm* — ALSTON & BIRD LLP

(57) ABSTRACT

An example apparatus for controlling one or more inverters is provided herein. In some embodiments, the apparatus for controlling one or more inverters may include one or more controllers. In some embodiments, each of the one or more inverters is associated with at least one power source. In some embodiments, each of the one or more controllers may configured to provide droop control, voltage magnitude control, phase control, frequency control and inertia control for an associated inverter of the one or more inverters. In some embodiments, each of the one or more controllers comprises a voltage control loop, a virtual inertia control loop, and a droop control loop enabling the power supplies to sync with a power grid and/or other power supplies when the power supply is disconnected from the power grid and/or other power supplies and/or connected to a power supply to the power grid and/or other power supplies.

20 Claims, 11 Drawing Sheets

1000

1010 — PROVIDE, USING ONE OR MORE CONTROLLERS, DROOP CONTROL, VOLTAGE MAGNITUDE CONTROL, PHASE CONTROL, FREQUENCY CONTROL AND INERTIA CONTROL FOR ONE OR MORE INVERTERS

1020 — DETERMINE A DROOP CONTROL LOOP OUTPUT

1030 — DETERMINE A VIRTUAL INERTIA LOOP OUTPUT

1040 — DETERMINE A VOLTAGE LOOP OUTPUT

APPARATUS AND METHOD FOR CONTROLLING ONE OR MORE INVERTERS

CROSS REFERENCE TO RELATED APPLICATIONS

This application is a continuation of U.S. Non-Provisional application Ser. No. 18/171,999, titled "Apparatus and Method for Controlling One or More Inverters" and filed Feb. 21, 2023, which claims the benefit of priority to U.S. Provisional Application Ser. No. 63/311,750, filed on Feb. 18, 2022, the contents of all of which are incorporated by reference herein in their entirety.

TECHNOLOGICAL FIELD

Embodiments of the present disclosure relate generally to an apparatus for controlling one or more inverters and an associated method.

BACKGROUND

Applicant has identified many technical challenges and difficulties associated with an apparatus for controlling one or more inverters and an associated method. Through applied effort, ingenuity, and innovation, Applicant has solved problems related to an apparatus for controlling one or more inverters and an associated method by developing solutions embodied in the present disclosure, which are described in detail below.

BRIEF SUMMARY

Various embodiments described herein relate to an apparatus and method for controlling one or more inverters.

In accordance with one aspect of the disclosure, an apparatus for controlling one or more inverters is provided. In some embodiments, the apparatus may include one or more controllers. In some embodiments, each of the one or more controllers is configured to provide droop control, voltage magnitude control, phase control, frequency control, and inertia control for an associated inverter of the one or more inverters. In some embodiments, each of the one or more controllers includes a voltage control loop, a virtual inertia control loop, and a droop control loop. In some embodiments, each of the one or more inverters is associated with at least one power source.

In some embodiments, the droop control loop is associated with a droop control loop input and a droop control loop output.

In some embodiments, the droop control loop input comprises an active power and a reactive power and the droop control loop output includes a point of common coupling reference voltage magnitude and a reference frequency.

In some embodiments, the droop control loop comprises one or more droop coefficients.

In some embodiments, the virtual inertia control loop is associated with a virtual inertia control loop input and a virtual inertia control loop output.

In some embodiments, the virtual inertia control loop input comprises the active power and the reference frequency and the virtual inertia control loop output comprises a phase angle and a point of common coupling reference voltage.

In some embodiments, the virtual inertia control loop comprises one or more inertia coefficients.

In some embodiments, the voltage control loop is associated with a voltage control loop input and a voltage control loop output.

In some embodiments, the voltage control loop input comprises the point of common coupling reference voltage and the voltage control loop output comprises an inverter reference voltage.

In some embodiments, the at least one power source comprises a direct current power source.

In some embodiments, the one or more controllers comprise two or more controllers.

In some embodiments, the one or more inverters comprise two or more inverters.

In some embodiments, a first inverter of the two or more inverters is in parallel with a second inverter of the two or more inverters.

In accordance with another aspect of the disclosure, a method for controlling one or more inverters is provided. In some embodiments, the method may include providing, using one or more controllers, droop control, voltage magnitude and phase control, frequency control and inertia control for the one or more inverters. In some embodiments, the one or more controllers include a voltage control loop, a virtual inertia control loop, and a droop control loop. In some embodiments, each of the one or more inverters associated with at least one power source.

In some embodiments, the droop control loop is associated with a droop control loop input and a droop control loop output.

In some embodiments, the droop control loop input comprises an active power and a reactive power and the droop control loop output includes a point of common coupling reference voltage magnitude and a reference frequency.

In some embodiments, the droop control loop comprises one or more droop coefficients.

In some embodiments, the virtual inertia control loop is associated with a virtual inertia control loop input and a virtual inertia control loop output.

In some embodiments, the virtual inertia control loop input comprises the active power and the reference frequency and the virtual inertia control loop output comprises a phase angle and a point of common coupling reference voltage.

In some embodiments, the virtual inertia control loop comprises one or more inertia coefficients.

In some embodiments, the voltage control loop is associated with a voltage control loop input and a voltage control loop output.

In some embodiments, the voltage control loop input comprises the point of common coupling reference voltage and the voltage control loop output comprises an inverter reference voltage.

In some embodiments, the at least one power source comprises a direct current power source.

In some embodiments, the one or more controllers comprise two or more controllers.

In some embodiments, the one or more inverters comprise two or more inverters.

In some embodiments, a first inverter of the two or more inverters is in parallel with a second inverter of the two or more inverters.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Reference will now be made to the accompanying drawings. The components illustrated in the figures may or may not be present in certain embodiments described herein. Some embodiments may include fewer (or more) components than those shown in the figures in accordance with an example embodiment of the present disclosure.

DETAILED DESCRIPTION

Figure 1:
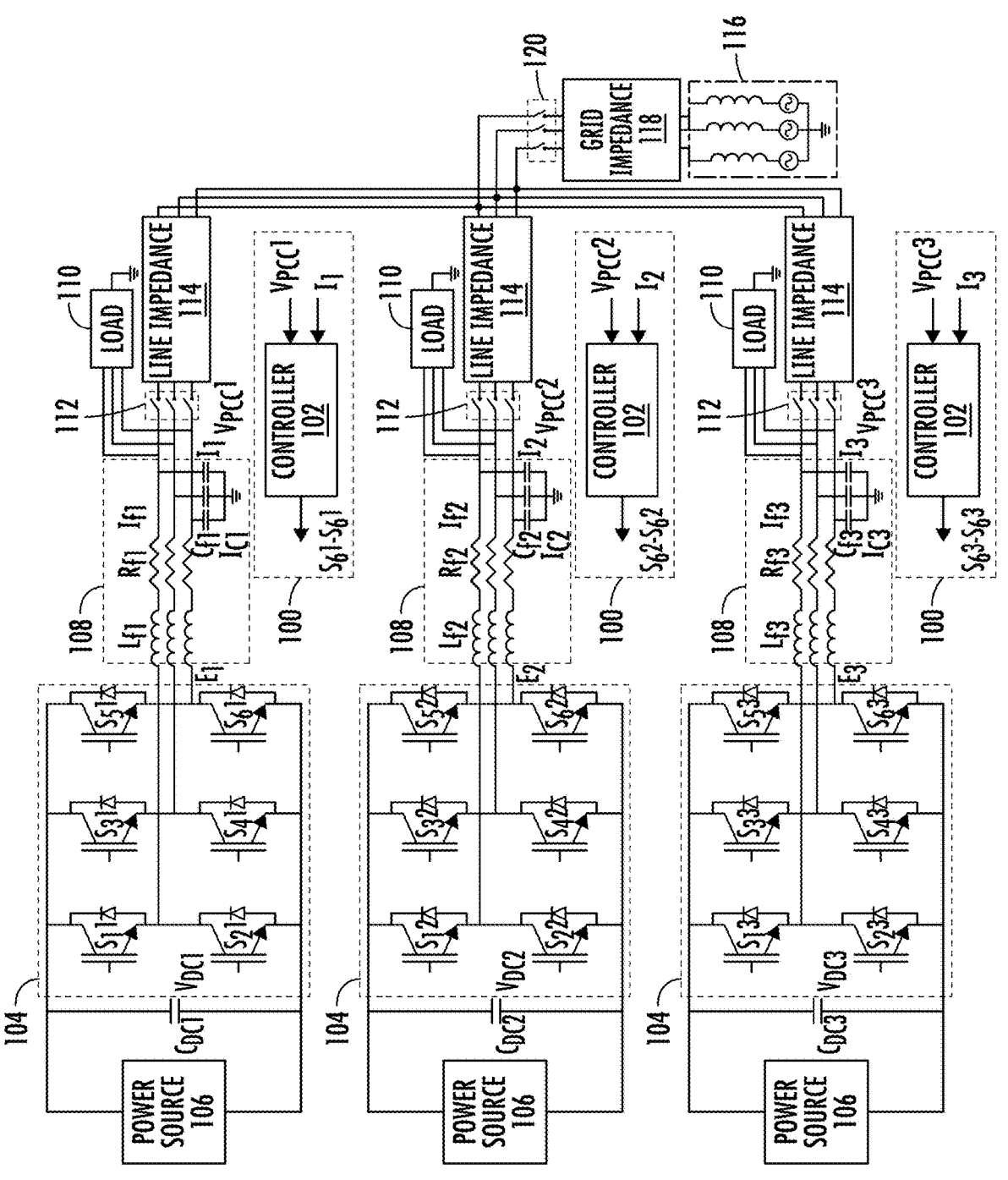
FIG. 1 illustrates a schematic view of an example apparatus for controlling one or more inverters in accordance with one or more embodiments of the present disclosure.

Example embodiments will be described more fully hereinafter with reference to the accompanying drawings, in which some, but not all embodiments of disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Example embodiments disclosed herein address technical problems associated with apparatuses for controlling one or more inverters. As would be understood by one skilled in the field to which this disclosure pertains, there are numerous example scenarios in which a user may use an apparatus for controlling one or more inverters.

In power systems it is often desirable to be able to seamlessly disconnect a power supply from a power grid and/or other power supplies and/or connect a power supply to the power grid and/or other power supplies. For example, it may be desirable to disconnect a power supply from the power grid to perform maintenance on the power supply and then reconnect the power supply once the maintenance is completed. As another example, it may be desirable to disconnect a power supply from the power grid when the power supply is not needed (e.g., during a time when there is low demand for power) and reconnect the power supply when the power supply is needed (e.g., during a time when there is a high demand for power). As another example, it may be desirable to disconnect a power supply from the power grid when the power supply may only be capable of providing power to a local load associated with the power supply (e.g., a roof top solar panel may be disconnected from the power grid when the roof top solar panel is providing power to a building associated with the roof top solar panel) and reconnect the power supply when the power supply is capable of providing power to other loads (e.g., a roof top solar panel may be reconnected to the power grid when the roof top solar panel is generating more power than needed by the building associated with the roof top solar panel). As another example, it may be desirable to disconnect a power supply from the power grid when the power grid is unstable and connect the power supply to another power supply to form a micro-grid with the other power supply. As another example, it may be desirable to disconnect a power supply from another power supply when the power supply has an excess supply of power and connect the power supply to the power grid so that the excess power supply can be provided to the power grid.

In order to seamlessly disconnect a power supply from the power grid and/or other power supplies and/or connect a power supply to the power grid and/or other power supplies it is necessary that the droop, phase, inertia, voltage magnitude, and/or frequency of the power supply is in sync with the power grid and/or other power supplies when the power supply is connected to the power grid and/or other power supplies. Example solutions for seamlessly disconnecting a power supply from the power grid and/or other power supplies and/or connecting a power supply to the power grid and/or other power supplies include using a rotating machine based power supply (e.g., a power supply that produces alternating current (AC) power). Rotating machine based power supplies are configured such that the droop, phase, inertia, voltage magnitude, and/or frequency of the power supply can be automatically synced with the power grid and/or other power supplies when the power supply is disconnected from the power grid and/or other power supplies and/or connected to a power supply to the power grid and/or other power supplies.

Although rotating machine based power supplies are configured such that the droop, phase, inertia, voltage magnitude, and/or frequency of the power supply may be automatically synced with the power grid and/or another power supply when the power supply is disconnected from the power grid and/or other power supplies and/or connected to a power supply to the power grid and/or other power supplies, many rotating machine based power supplies are implemented using fossil fuels (e.g., an AC generator that uses natural gas). As such, recently, many rotating based power supplies are being supplanted by renewable energy based power supplies (e.g., solar panels). However, many renewable energy based power supplies are not rotating machine based power supplies. Instead, many renewable energy based power supplies are inverter based power supplies (e.g., inverter based power supplies that supply direct current (DC) power) which are not configured to automatically sync with the power grid and/or another power supply when the power supply such that the droop (e.g., an inverter based power supply has no inbuild droop characteristics), phase (e.g., an inverter based power supply has no inbuild phase-synchronism), inertia (e.g., an inverter based power supply has no rotating inertia), voltage magnitude, and/or frequency is in sync with the power grid and/or other power supplies when the power supply is disconnected from the power grid and/or other power supplies and/or connected to a power supply to the power grid and/or other power supplies. Accordingly, there is a need for apparatuses and methods that enable control of inverters such that inverter based power supplies are able to sync with the power grid and/or other power supplies when the power supply is disconnected from the power grid and/or other power supplies and/or connected to a power supply to the power grid and/or other power supplies.

Thus, to address these and/or other issues related to controlling one or more inverters, example apparatuses and/or associated methods for controlling one or more inverters are disclosed herein. For example, an embodiment in this disclosure, described in greater detail below, includes an apparatus for controlling one or more inverters. In some embodiments, the apparatus includes one or more controllers. In some embodiments, each of the one or more controllers is configured to provide droop control, voltage magnitude control, phase control, frequency control and inertia control for an associated inverter of the one or more inverters. In some embodiments, each of the one or more controllers comprises a voltage control loop, a virtual inertia control loop, and a droop control loop. In some embodiments, each of the one or more inverters is associated with at least one power source. As such, the apparatus for controlling one or more inverters is configured such that the inverter based power supplies are able to sync with the power grid and/or other power supplies when the power supply is disconnected from the power grid and/or other power supplies and/or connected to a power supply to the power grid and/or other power supplies. In this regard, the apparatus for controlling one or more inverters may be a synchronous machine emulator with embedded droop control.

Example Apparatus

Embodiments of the present disclosure herein include an apparatus for controlling one or more inverters 100. It should be readily appreciated that the embodiments of the apparatus for controlling one or more inverters 100 described herein may be configured in various additional and alternative manners in addition to those expressly described herein.

Figure 2:
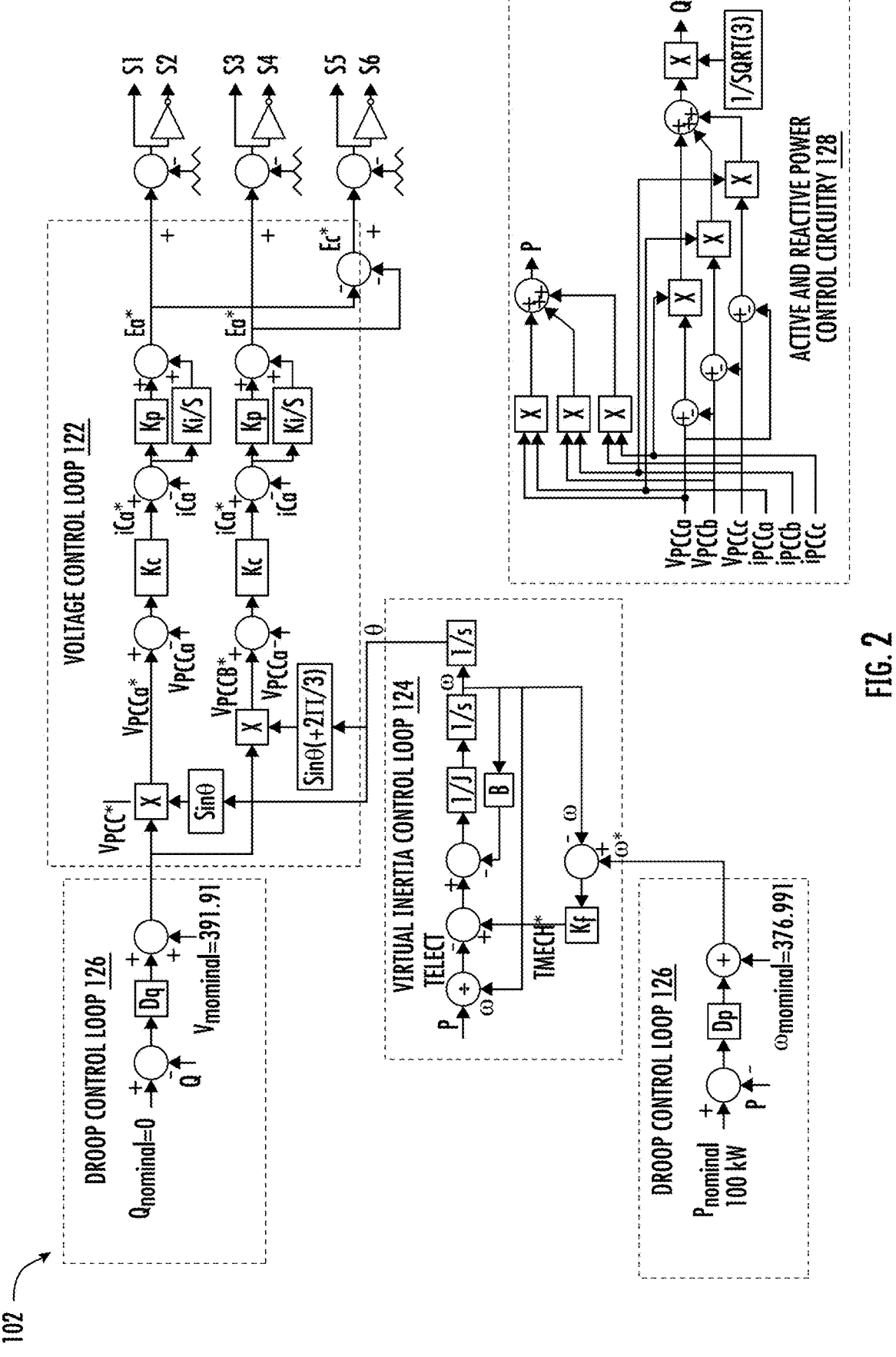
FIG. 2 illustrates a schematic view of a controller in accordance with one or more embodiments of the present disclosure.

With reference to FIGS. 1 and 2, in some embodiments, the apparatus for controlling one or more inverters 100 may include one or more controllers 102. In some embodiments, the apparatus for controlling one or more inverters 100 may include two or more controllers 102. For example, such as depicted in FIG. 1, the apparatus for controlling one or more inverters 100 may include three controllers 102.

In some embodiments, each of the one or more controllers 102 may be configured to control an associated inverter of one or more inverters 104. In this regard, for example, the one or more controllers 102 may be in electrical communication with an associated inverter of the one or more inverters 104. In some embodiments, the one or more inverters 104 may include two or more inverters 104. In this regard, for example, at least one inverter of the one or more inverters 104 may be in parallel with another inverter of the one or more inverters 104. For example, a first inverter may be in parallel with a second inverter. In this regard, for example, since the one or more inverters 104 may be in parallel with each other and each of the one or more inverters 104 may be connected to other inverters of the one or more inverters 104 (e.g., to form micro-grids), the one or more inverters 104 may be considered parallel-connected grid-forming inverters. In some embodiments, each of the one or more controllers 102 may be configured to provide at least one of droop control, voltage magnitude control, phase control (e.g., phase synchronism control), frequency control, and/or inertia control for an associated inverter of the one or more inverters 104. In some embodiments, each of the one or more inverters 104 may include one or more transistors. For example, such as illustrated in FIG. 1, each of the one or more inverters 104 may include six transistors. In some embodiments, the one or more transistors may be insulated-gate bipolar transistors.

In some embodiments, each of the one or more controllers 102 may be in electrical communication with at least one other controller 102 of the one or more controllers 102. In this regard, for example, each of the one or more controllers 102 may be configured to control an associated inverter of the one or more inverters 104 when in electrical communication with least one other controller 102 of the one or more controllers 102. Alternatively, each of the one or more controllers 102 may not be in electrical communication with at least one other controller 102 of the one or more controllers 102. In this regard, for example, each of the one or more controllers 102 may be configured to control an associated inverter of the one or more inverters 104 when not in electrical communication with least one other controller 102 of the one or more controllers 102.

In some embodiments, each of the one or more inverters 104 may be associated with a power source 106. In this regard, for example, each power source 106 may be an inverter based power source (e.g., the power source 106 may include a direct current (DC) power source). For example, each power source 106 may include one or more of a battery, a solar panel (e.g., a renewable power source), a DC generator, and/or the like. In some embodiments, each power source 106 may include an alternating current (AC) power source. For example, each power source 106 may include a wind turbine, and AC generator, and/or the like. In some embodiments, such as depicted in FIG. 1, each power source 106 may be configured to provide three-phase power. In some embodiments, each power source 106 may be configured to provide single-phase power.

In some embodiments, each of the one or more inverters 104 may be associated with a filter 108. In some embodiments, each filter 108 may include one or more of an inductor $(L_f)$, a capacitor $(C_f)$, and/or a resistor $(R_f)$. In this regard, for example, each of the one or more inverters 104 may be in electrical communication with an associated filter 108. In some embodiments, each filter 108 may be configured to at least partially filter harmonics. For example, each filter 108 may be configured to at least partially filter harmonics associated with an inverter voltage (E) (e.g., a voltage output by each of the one or more inverters 104). In some embodiments, each filter 108 may be associated with a capacitor current ($I_c$). For example, the capacitor current ($I_c$) may be a current associated with one or more capacitors ($C_f$) included in each filter 108.

In some embodiments, each of the one or more inverters 104 may be associated with a load 110. In some embodiments, each load 110 may be any electrical component that consumes power (e.g., a light). In some embodiments, each load 110 may consume power provided by an associated power source 106. In this regard, for example, power source 106 may be in electrical communication with an associated load 110. In some embodiments, each load 110 may be an active load. Additionally or alternatively, each load 110 may be a reactive load. In some embodiments, each load 110 may be impacted by load disturbance. Said differently, for example, each load 110 may be periodically altered (e.g., due to a change in demand at the load 110 etc.).

In some embodiments, each of the one or more inverters 104 may be associated with a breaker 112. In some embodiments, the breaker 112 associated with each of the one or more inverters 104 may be configured to be in a closed position when each of the one or more inverters 104 is connected to other inverters of the one or more inverters 104 and/or a power grid 116. Alternatively, the breaker 112 associated with each of the one or more inverters 104 may be in an open position when each of the one or more inverters 104 is not connected to other inverters of the one or more inverters 104 and/or the power grid 116. In some embodiments, each breaker 112 may be located at a point of common coupling (PCC). That is, for example, the breaker 112 associated with each inverter of the one or more inverters may be located at a point where the load 110 associated with each inverter interfaces with other inverters of the one or more inverters 104 and/or the power grid 116. In some embodiments, each inverter of the one or more inverters 104 may have black-start capability. Said differently, in some embodiments, each inverter of the one or more inverters 104 may be capable of starting to operate (e.g., the power source 106 associated with each inverter begins to supply power) without being connected to the power grid 116 (e.g., the breaker 112 associated with each inverter is in the open position).

In some embodiments, the one or more inverters 104 may be associated with a power grid breaker 120. In some embodiments, the power grid breaker 120 associated with the one or more inverters 104 may be configured to be in a closed position when the power grid 116 is connected to the one or more inverters 104. Alternatively, the power grid breaker 120 associated with the one or more inverters 104 may be configured to be in an open position when the power grid 116 is not connected to the one or more inverters 104. In some embodiments, each of the one or more controllers 102 may be configured to control an associated inverter of the one or more inverters 104 when the associated inverter is connected to other inverters of the one or more inverters 104 (e.g., the breakers 112 associated with at least two inverters of the one or more inverters 104 is in the closed position) and/or the power grid 116 (e.g., the breaker 112 associated with at least one inverter of the one or more inverters 104 and the power grid breaker 120 are in the closed position). Additionally or alternatively, each of the one or more controllers 102 may be configured to control an associated inverter of the one or more inverters 104 when the associated inverter is not connected to other inverters of the one or more inverters 104 (e.g., the breaker 112 of an inverter of the one or more inverters 104 is in the open position) and/or the power grid 116 (e.g., the breaker 112 of an inverter of the one or more inverters 104 is in the open position or the power grid breaker 120 is in the open position).

In some embodiments, each of the one or more inverters 104 may be configured to be in electrical communication with at least one other inverter of the one or more inverters 104 via at least one or more electrical connectors, such as wires, transmission lines, and/or the like. Similarly, each of the one or more inverters 104 may be configured to be in electrical communication with the power grid 116 via at least one or more electrical connectors, such as wires, transmission lines, and/or the like. In this regard, for example, the electrical connectors may be associated with an impedance, such as line impedance 114 and grid impedance 118.

In some embodiments, each of the one or more controllers 102 may include active and reactive power control circuitry 128. In some embodiments, the active and reactive power control circuitry 128 may be configured to determine an active power (P) and a reactive power (Q) associated with an associated inverter of the one or more inverters 104. For example, the active and reactive power control circuitry 128 may be configured to determine the active power (P) and the reactive power (Q) based on a point of common coupling voltage ($V_{pcc}$) (e.g., the voltage at the point of common coupling (PCC)) and/or a point of common coupling current ($I_{pcc}$) (e.g., the current at the point of common coupling (PCC)).

In some embodiments, each of the one or more controllers 102 may include a droop control loop 126. In some embodiments, the droop control loop 126 may be configured to at least partially provide droop control for an associated inverter of the one or more inverters 104. In some embodiments, the droop control loop 126 may be associated with a droop control loop input and/or a droop control loop output.

Figure 3:
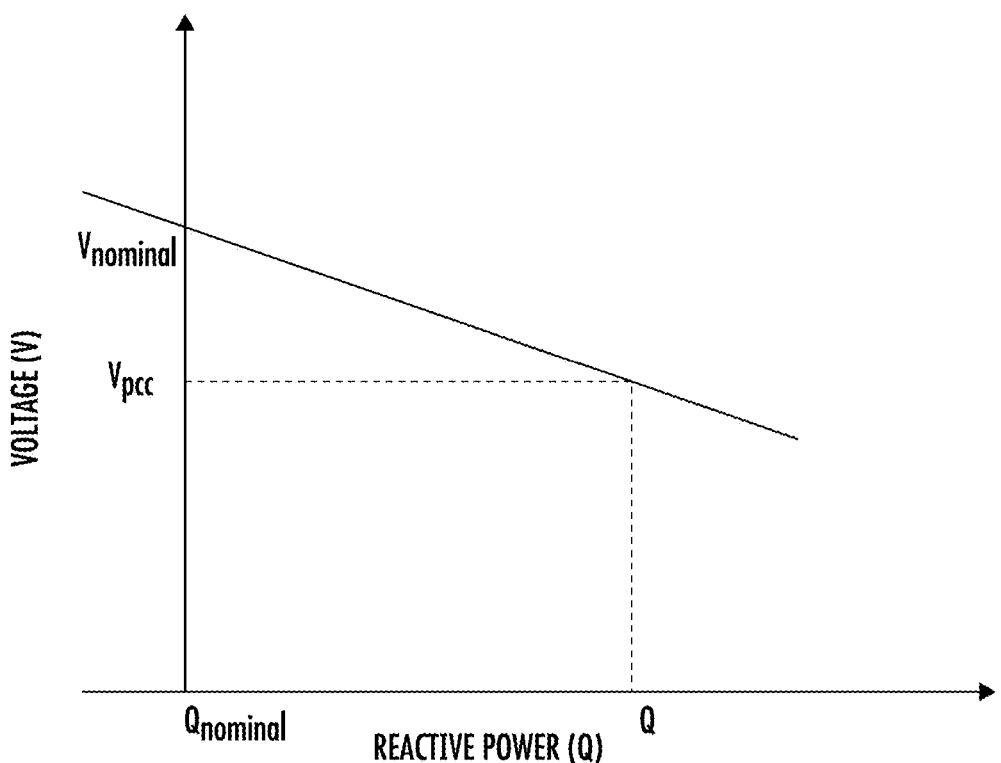
FIG. 3 illustrates an example droop characteristics curve in accordance with one or more embodiments of the present disclosure.
Figure 4:
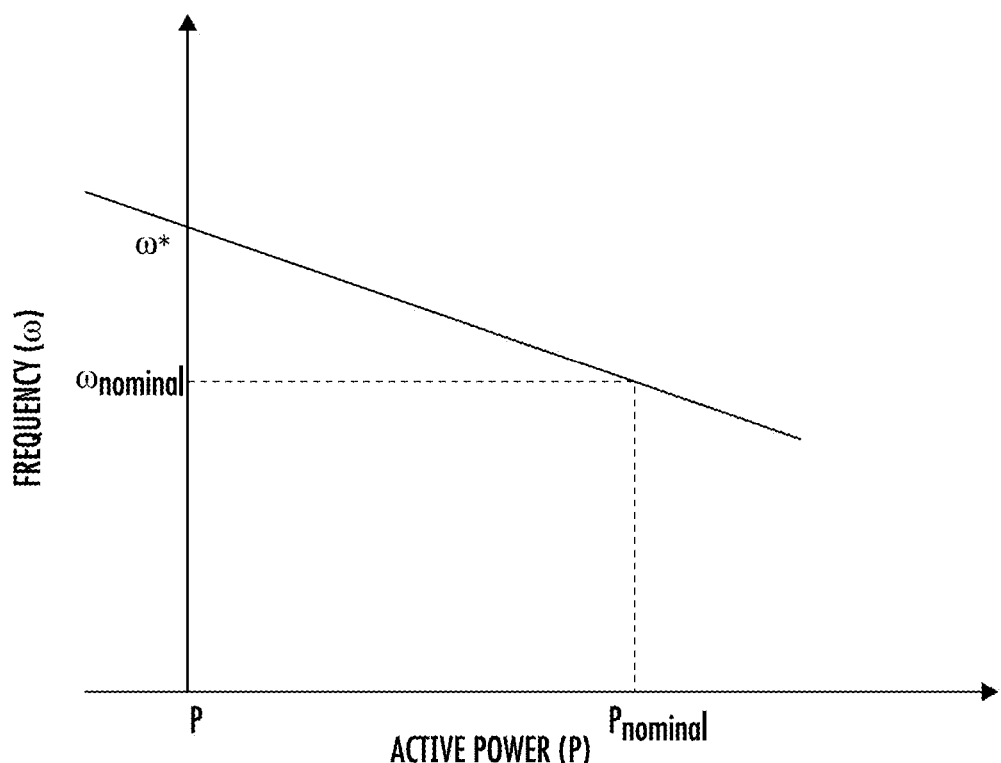
FIG. 4 illustrates another example droop characteristics curve in accordance with one or more embodiments of the present disclosure.

In some embodiments, the droop control loop input may include active power (P) and/or reactive power (Q). For example, in some embodiments, the droop control loop input may include the power (P) and/or the reactive power (Q) determined by the active and reactive power control circuitry 128. In some embodiments, the droop control loop output may include a point of common coupling reference voltage magnitude ($|V_{pcc}*|$) and a reference frequency ($\omega*$). In some embodiments, the point of common coupling reference voltage magnitude ($|V_{pcc}*|$) may be determined at least in part by comparing the reactive power (Q) with a nominal reactive power ($Q_{nominal}$) and multiplying the comparison by a first droop coefficient ($D_q$). In this regard, for example, the first droop coefficient ($D_q$) may be determined based at least in part on a voltage (V) and reactive power (Q) droop characteristics curve, such as the example voltage (V) and reactive power (Q) droop characteristics curve illustrated in FIG. 3. In some embodiments, the reference frequency ($\omega*$) may be determined at least in part by comparing the active power (P) with a nominal active power ($P_{nominal}$) and multiplying the comparison by a second droop coefficient ($D_p$). In this regard, for example, the second droop coefficient ($D_p$) may be determined based at least in part on a frequency ($\omega$) and active power (P) droop characteristics curve, such as the example frequency ($\omega$) and active power (P) droop characteristics curve illustrated in FIG. 4.

In some embodiments, each of the one or more controllers 102 may include a virtual inertia control loop 124. In some embodiments, the virtual inertia control loop 124 may be configured to at least partially provide phase control (e.g., phase synchronism control), frequency control, and/or inertia control for an associated inverter of the one or more inverters 104. In some embodiments, the virtual inertia control loop 124 may be associated with a virtual inertia control loop input and/or a virtual inertia control loop output.

In some embodiments, the virtual inertia control loop input may include active power (P) and/or the reference frequency ($\omega^*$). For example, the active power (P) may be determined by the active and reactive power control circuitry 128 and/or the reference frequency ($\omega^*$) may be determined by droop control loop 126. In some embodiments, the virtual inertia control loop output may include a phase angle ($\theta$) and the point of common coupling reference voltage ($V_{pcc}^*$). In some embodiments, the virtual inertia control loop output may be determined at least based on equations (1)-(4):

$$\bar{e} = \bar{v} + \bar{\iota}R + L_s\frac{d\bar{\iota}}{dt},\tag{1}$$

$$P_{elect} = E_a i_a + E_b i_b + E_c i_c,\tag{2}$$

$$T_{elect} = \frac{P_{elect}}{\omega},\tag{3}$$

$$T_{mech} = T_{elect} + B\omega + J\frac{d\omega}{dt},\tag{4}$$

where $\bar{e}$ represents excitation voltage vector, $\bar{v}$ represents generated voltage vector, $\bar{\iota}$ represents armature current vector, R represents armature resistance, $L_s$ represents synchronous inductance, $P_{elect}$ represents electronic power, $T_{elect}$ represents electronic torque, $T_{mech}$ represents mechanical torque, $\omega$ represents the frequency, and J and B represent the inertia constants (e.g., inertia constants associated with the apparatus for controlling one or more inverters 100). In some embodiments, the inertia constants J and B may be adjusted to obtain the desired phase control. For example, the inertia constants J and B may be adjusted to control the speed (e.g., how much time) at which a phase associated with an inverter voltage (E) synchronizes at the point of common coupling (PCC).

In some embodiments, each of the one or more controllers 102 may include a voltage control loop 122. In some embodiments, the voltage control loop 122 may be configured to at least partially provide voltage magnitude control for an associated inverter of the one or more inverters 104. In some embodiments, the voltage control loop 122 may be associated with a voltage control loop input and a voltage control loop output.

In some embodiments, the voltage control loop input may be a point of common coupling reference voltage ($V_{pcc}^*$). In some embodiments, the voltage control loop output may include an inverter reference voltage (E*). In some embodiments, the inverter reference voltage (E*) may be determined at least in part by applying one or more control gains to the point of common coupling reference voltage ($V_{pcc}^*$). For example, the inverter reference voltage (E*) may be determined at least in part by applying one or more of a proportional gain ($k_p$), an integral gain ($k_i$), and/or a controller gain ($k_c$). Additionally or alternatively, the inverter reference voltage (E*) may be determined at least in part by applying the capacitor current ($I_c$) associated with each filter 108 to the point common coupling reference voltage ($V_{pcc}^*$).

In some embodiments, the inverter reference voltage (E*) may be used to generate a switching signal for each transistor in an associated inverter of the one or more inverters

104. For example, the inverter reference voltage (E*) may be used to generate six switching signals ($S_1$-$S_6$) when the associated inverter of the one or more inverters 104 has six transistors. In some embodiments, the switching signals may be generated based at least in part on the sinusoidal pulse width modulation technique. For example, when the associated inverter of the one or more inverters 104 has six transistors, each phase of the inverter reference voltage (E*) may be compared with a repeating triangular wave signal of a predetermined frequency to generate $S_1$, $S_3$, and $S_5$, and $S_2$ may be the conjugate of $S_1$, $S_4$ may be the conjugate of $S_2$, and $S_6$ may be the conjugate of $S_5$.

Figure 5:
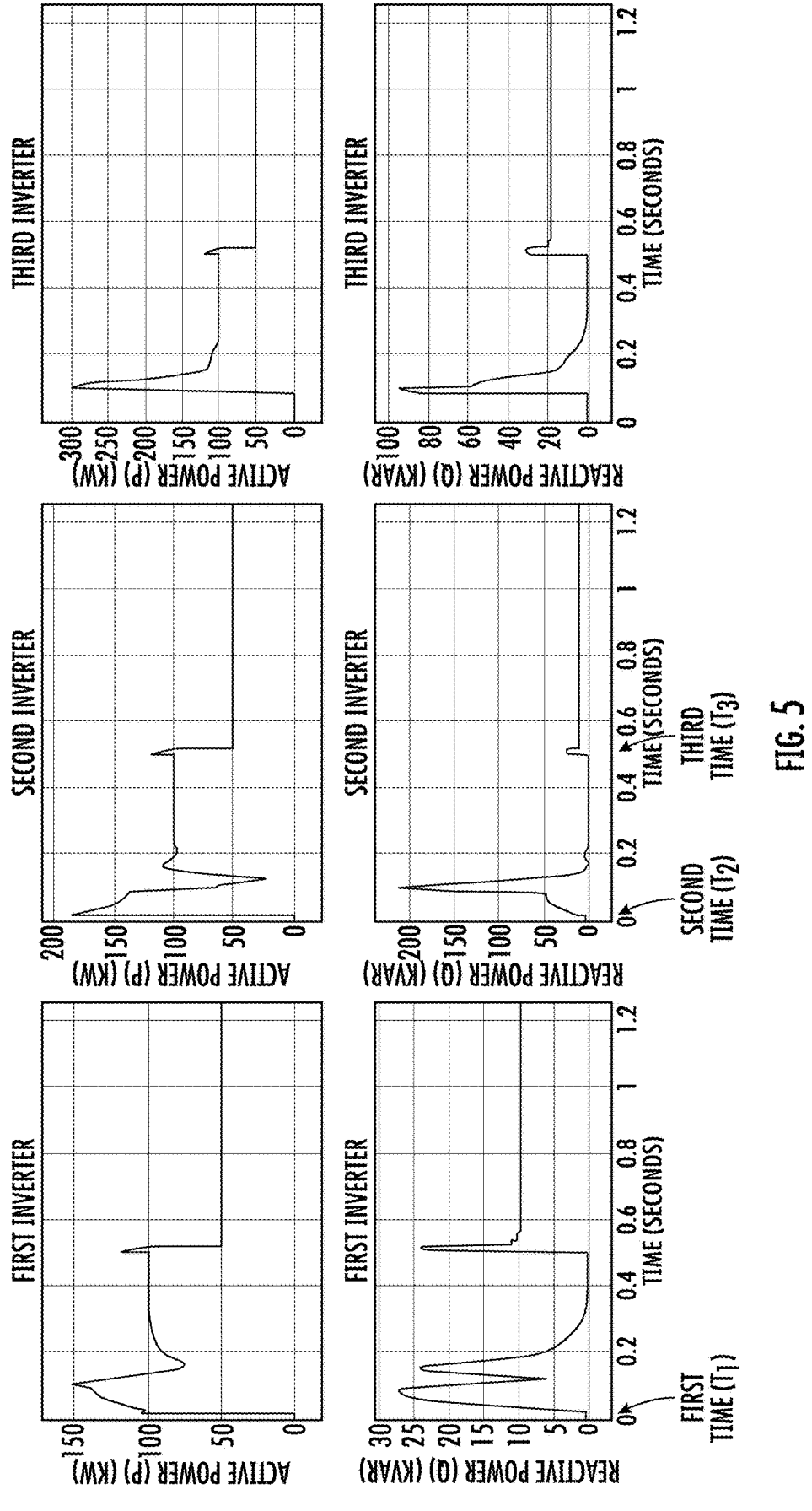
FIG. 5 illustrates a simulation result of active power (P) and reactive power (Q) in accordance with one or more embodiments of the present disclosure.
Figure 6:
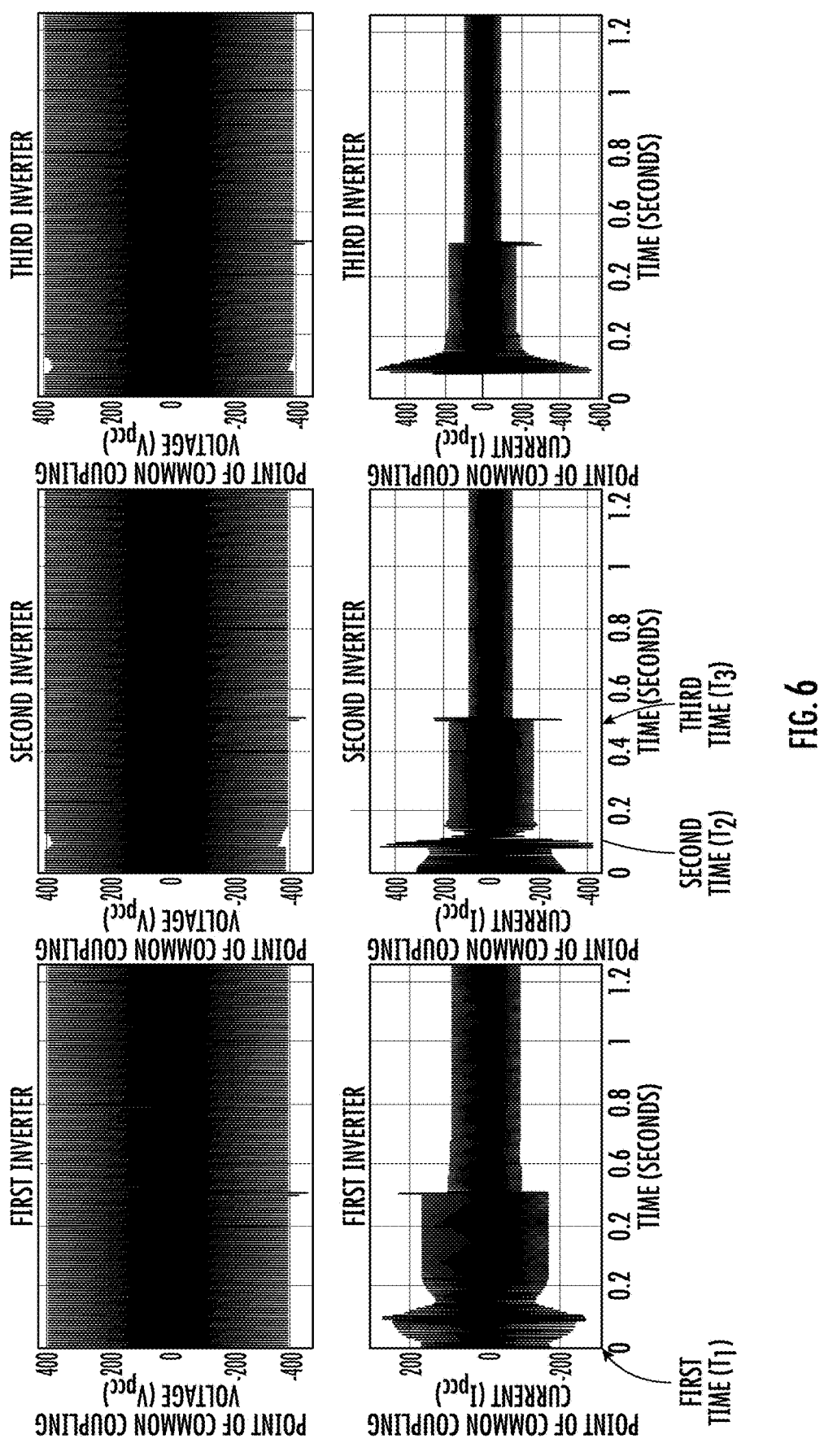
FIG. 6 illustrates a simulation result of point of common coupling voltage ($V_{pcc}$) and point of common coupling current ($I_{pcc}$) in accordance with one or more embodiments of the present disclosure.
Figure 7:
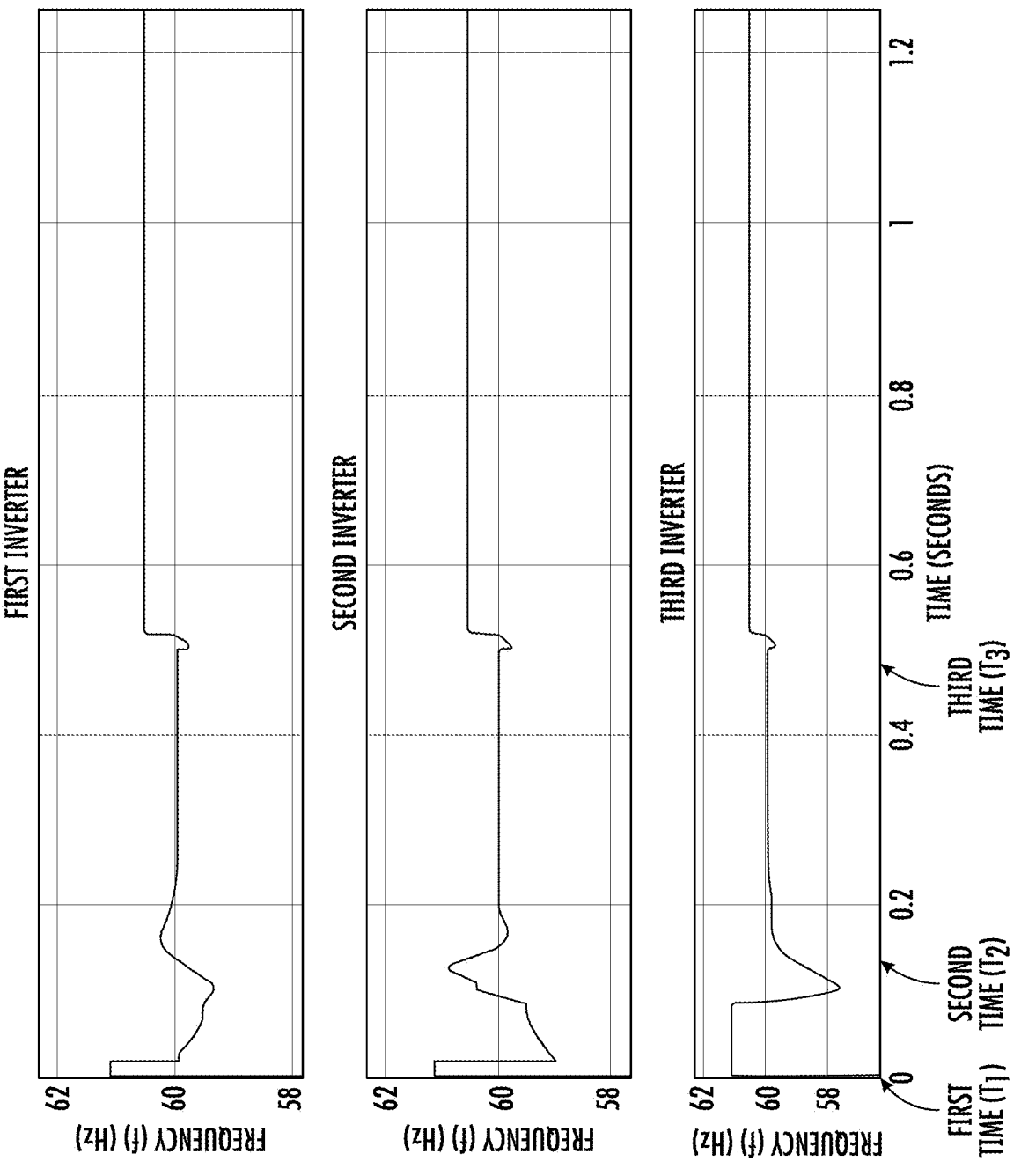
FIG. 7 illustrates a simulation result of frequency (f) in accordance with one or more embodiments of the present disclosure.

With reference to FIGS. 5-7, simulation results of the apparatus for controlling one or more inverters 100 are illustrated. In this regard, for example, FIGS. 5-7 illustrate simulation results of the apparatus for controlling one or more inverters 100 when the apparatus for controlling one or more inverters 100 includes a first controller of the one or more controllers 102 associated with a first inverter of the one or more inverters 104, a second controller of the one or more controllers 102 associated with a second inverter of the one or more inverters 104, and a third controller of the one or more controllers 102 associated with a third inverter of the one or more inverters 104. In this regard, for example, FIG. 5 illustrates the simulated active power (P) and the simulated reactive power (Q) associated with the first inverter, the second inverter, and the third inverter, which demonstrates the stability of the active power (P) and reactive power (Q) associated with the first inverter, the second inverter, and the third inverter. FIG. 6 illustrates the simulated point of common coupling voltage ($V_{pcc}$) and the simulated point of common coupling current ($I_{pcc}$) associated with the first inverter, the second inverter, and the third inverter, which demonstrates the robustness of the simulated point of common coupling voltage ($V_{pcc}$) and the simulated point of common coupling current ($I_{pcc}$) when exposed to load disturbances associated with the first inverter, the second inverter, and the third inverter. FIG. 7 illustrates the simulated frequency (f) associated with the first inverter, the second inverter, and the third inverter, which demonstrates the impact of the droop control provided to the first inverter, the second inverter, and the third inverter by an associated controller of the one or more controllers 102.

FIGS. 5-7 illustrate simulation results of the apparatus for controlling one or more inverters 100 when the first inverter and the second inverter are initiated at a first time ($t_1$) (e.g., the first inverter and the second inverter are connected to each other at the first time ($t_1$) and/or the power source 106 associated with the first inverter and the power source 106 associated with the second inverter begin supplying power at the first time ($t_1$)) and the third inverter is initiated a second time ($t_2$) (e.g., the third inverter is connected to the first inverter and the second inverter at the second time ($t_2$) and/or the power source 106 associated with the third inverter begins supplying power at the second time ($t_2$)). Said differently, for example, FIGS. 5-7 illustrate simulation results of the apparatus for controlling one or more inverters 100 when the first inverter, the second inverter, and the third inverter are connected together to form a micro-grid. In some embodiments, the first time ($t_1$) may be equal to 0 seconds and the second time ($t_2$) may be equal to 0.15 seconds. Additionally, FIGS. 5-7 illustrate simulation results of the apparatus for controlling one or more inverters 100 when the power consumption of the load 110 associated with each of the one or more inverters 104 is varied at a third time $(t_3)$. For example, the power consumption of the load 110 may be 100 KW at the first time $(t_1)$ and 50 kW at the third time $(t_3)$.

Figure 8:
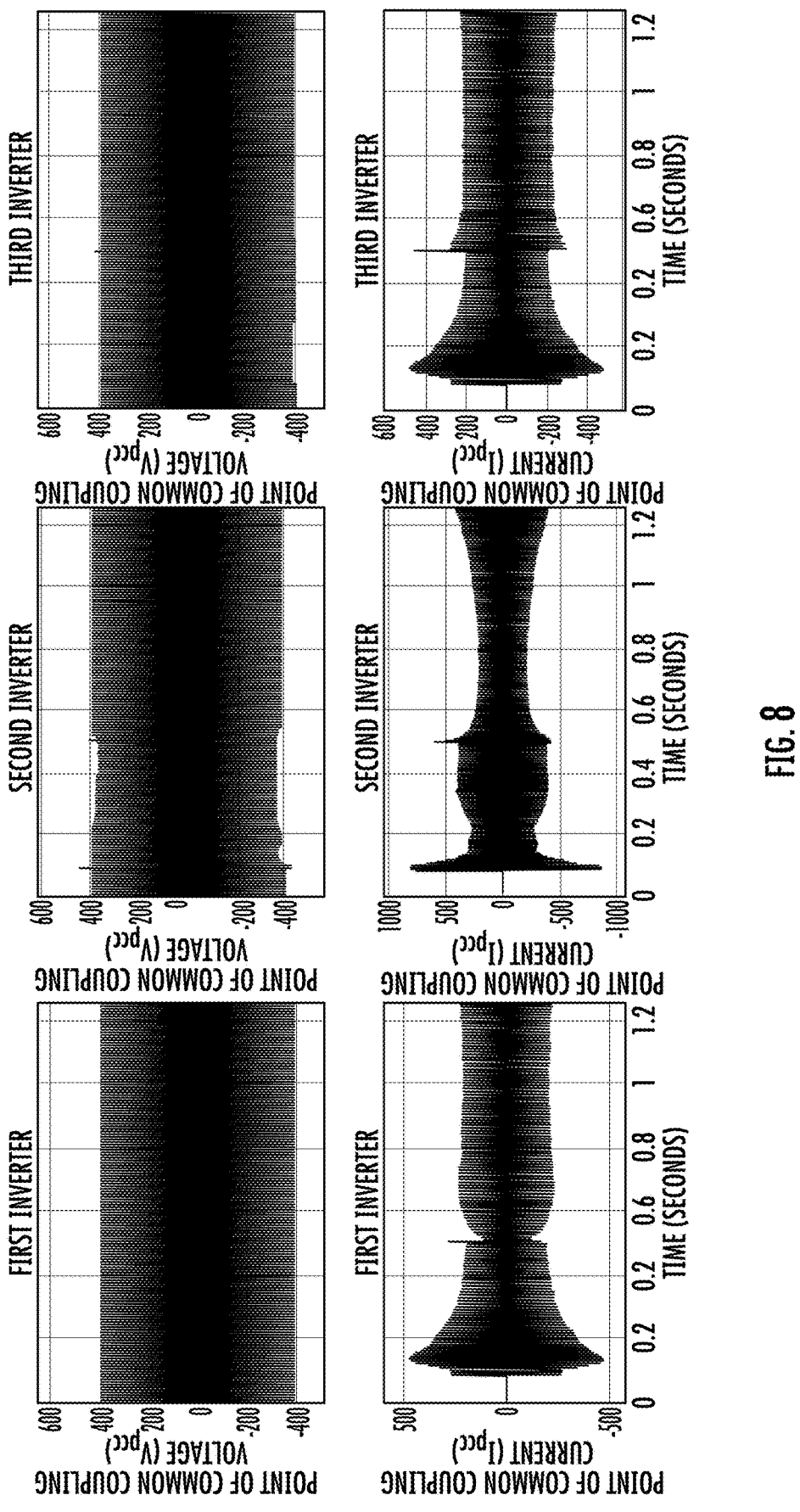
FIG. 8 illustrates another simulation result of point of common coupling voltage ($V_{pcc}$) and point of common coupling current ($I_{pcc}$) in accordance with one or more embodiments of the present disclosure.
Figure 9:
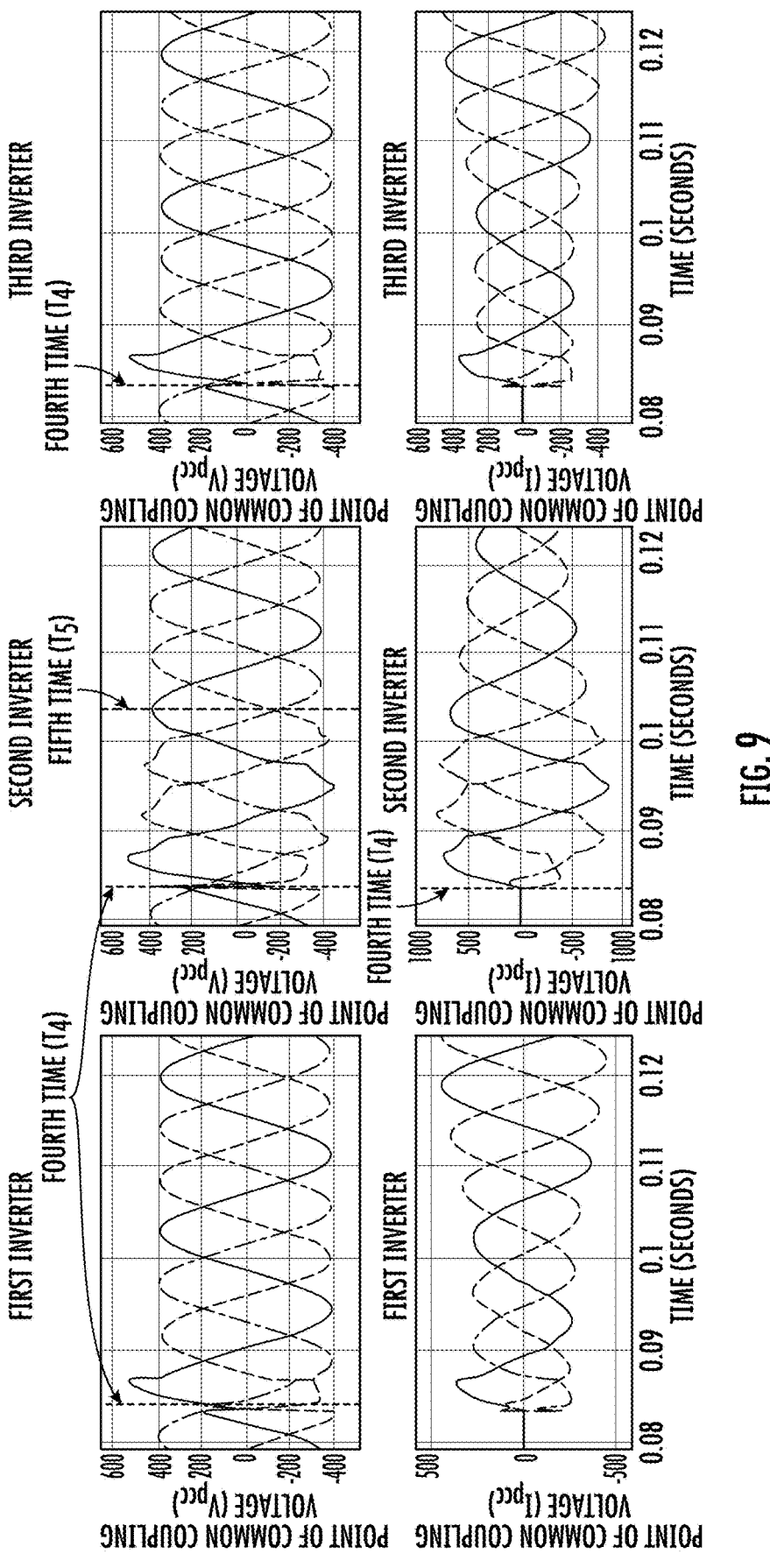
FIG. 9 illustrates a simulation result of point of common coupling voltage ($V_{pcc}$) and point of common coupling current ($I_{pcc}$) in accordance with one or more embodiments of the present disclosure.

With reference to FIGS. 8-9, simulation results of the apparatus for controlling one or more inverters 100 are illustrated. In this regard, for example, FIGS. 8-9 illustrate simulation results of the apparatus for controlling one or more inverters 100 when the apparatus for controlling one or more inverters 100 includes a first controller of the one or more controllers 102 associated with a first inverter of the one or more inverters 104, a second controller of the one or more controllers 102 associated with a second inverter of the one or more inverters 104, and a third controller of the one or more controllers 102 associated with a third inverter of the one or more inverters 104. In this regard, for example, FIG. 8 illustrates the simulated point of common coupling voltage $(V_{pcc})$ and the simulated point of common coupling current $(I_{pcc})$ associated with the first inverter, the second inverter, and the third inverter. FIG. 9 illustrates a close up view of the simulated point of common coupling voltage $(V_{pcc})$ and the simulated point of common coupling current $(I_{pcc})$ associated with the first inverter, the second inverter, and the third inverter illustrated in FIG. 8.

FIGS. 8-9 illustrate simulations results of the apparatus for controlling one or more inverters 100 when the first inverter, the second inverter, and the third inverter are connected to the power grid 116 at a fourth time $(t_4)$. Said differently, for example, FIGS. 8-9 illustrate simulation results of the apparatus for controlling one or more inverters 100 when the first inverter, the second inverter, and the third inverter were not connected to the power grid 116 for at least some time before the fourth time $(t_4)$. In some embodiments, the fourth time $(t_4)$ may be equal to 0.086 seconds. In some embodiments, the first inverter, the second inverter, and the third inverter may be synchronized with the power grid 116 by a fifth time $(T_5)$. For example, the phase control provided by the first controller may at least in part cause the first inverter to synchronize with the power grid 116 by the fifth time $(T_5)$, the second controller may at least in part cause the second inverter to synchronize with the power grid 116 by the fifth time $(T_5)$, and the third controller may at least in part cause the third inverter to synchronize with the power grid 116 by the fifth time $(T_5)$. In some embodiments, the fifth time $(T_5)$ may be equal to 0.104 seconds.

Example Method of Controlling One or More Inverters

Figure 10:
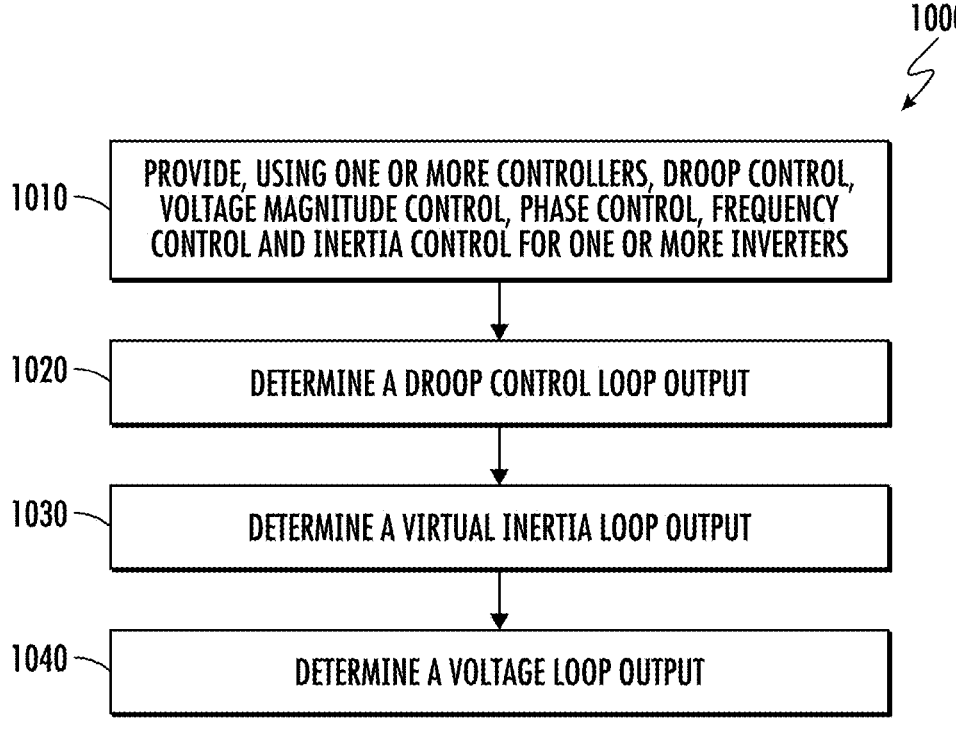
FIG. 10 illustrates a flowchart of an example method for controlling one or more inverters in accordance with one or more embodiments of the present disclosure.

Referring now to FIG. 10, a flowchart providing an example method 1000 for controlling one or more inverters is illustrated. In this regard, FIG. 10 illustrates operations that may be performed by each of the one or more controllers.

As shown in block 1010, the method 1000 for controlling one or more inverters may include providing, using one or more controllers, droop control, voltage magnitude control, phase control, frequency control, and inertia control for one or more inverters. As described above, in some embodiments there may be two or more controllers. For example, there may be three controllers. In some embodiments there may be two or more inverters. For example there may be three inverters. In some embodiments, each of the one or more inverters may include one or more transistors.

As described above, in some embodiments, each of the one or more inverters may be associated with a power source. In this regard, for example, each power source may be an inverter based power source (e.g., the power source may include a direct current (DC) power source). For example, each power source may include one or more of a battery, a solar panel (e.g., a renewable power source), a DC generator, and/or the like. In some embodiments, each power source may include an alternating current (AC) power source. For example, each power source may include a wind turbine, and AC generator, and/or the like. In some embodiments, each power source may be configured to provide three-phase power. In some embodiments, each power source 106 may be configured to provide single-phase power.

As described above, each of the one or more inverters may be associated with a filter. In some embodiments, the filter may include one or more of an inductor $(L_f)$, a capacitor $(C_f)$, and/or a resistor $(R_f)$. In this regard, for example, each of the one or more inverters may be in electrical communication with an associated filter. In some embodiments, each filter may be configured to at least partially filter harmonics. For example, each filter may be configured to at least partially filter harmonics associated with an inverter voltage (E) (e.g., a voltage output by each of the one or more inverters). In some embodiments, each filter may be associated with a capacitor current $(I_c)$. For example, the capacitor current $(I_c)$ may be a current associated with one or more capacitors $(C_f)$ included in each filter. In some embodiments, each of the one or more inverters may be associated with a load. In some embodiments, each load may be any electrical component that consumes power (e.g., a light). In some embodiments, each load may consume power provided by an associated power source. In this regard, for example, power source may be in electrical communication with an associated load. In some embodiments, each load may be an active load. Additionally or alternatively, each load may be a reactive load.

As described above, in some embodiments, each of the one or more inverters may be associated with a breaker. In some embodiments, the breaker may be configured to be in a closed position and/or an open position. As described above, in some embodiments, the one or more inverters may be associated with a power grid breaker. In some embodiments, the power grid breaker may be configured to be in a closed position and/or an open position.

As described above, in some embodiments, each of the one or more controllers may include active and reactive power control circuitry. In some embodiments, the active and reactive power control circuitry may be configured to determine an active power (P) and a reactive power (Q) associated with an associated inverter of the one or more inverters. For example, the active and reactive power control circuitry may be configured to determine the active power (P) and the reactive power (Q) based on a point of common coupling voltage $(V_{pcc})$ (e.g., the voltage at the point of common coupling (PCC)) and/or a point of common coupling current $(I_{pcc})$ (e.g., the current at the point of common coupling (PCC)).

As shown in block 1020, the method 1000 for controlling one or more inverters may include determining a droop control loop output. As described above, in some embodiments, each of the one or more controllers may include a droop control loop. In some embodiments, the droop control loop may be configured to at least partially provide droop control for an associated inverter of the one or more inverters.

As described above, in some embodiments, the droop control loop input may include active power (P) and/or reactive power (Q). For example, in some embodiments, the droop control loop input may include the power (P) and/or the reactive power (Q) determined by the active and reactive power control circuitry. In some embodiments, the droop control loop output may include a point of common coupling reference voltage magnitude ($|V_{pcc}^*|$) and a reference frequency ($\omega^*$). In some embodiments, the point of common coupling reference voltage magnitude ($|V_{pcc}^*|$) may be determined at least in part by comparing the reactive power (Q) with a nominal reactive power ($Q_{nominal}$) and multiplying the comparison by a first droop coefficient ($D_q$). In some embodiments, the reference frequency ($\omega^*$) may be determined at least in part by comparing the active power (P) with a nominal active power ($P_{nominal}$) and multiplying the comparison by a second droop coefficient ($D_p$).

As shown in block 1030, the method 1000 for controlling one or more inverters may include determining a virtual inertia loop output. As described above, in some embodiments, each of the one or more controllers may include a virtual inertia control loop. In some embodiments, the virtual inertia control loop may be configured to at least partially provide phase control, frequency control, and/or inertia control for an associated inverter of the one or more inverters.

As described above, in some embodiments, the virtual inertia control loop input may include active power (P) and/or the reference frequency ($\omega^*$). For example, the active power (P) may be determined by the active and reactive power control circuitry and/or the reference frequency ($\omega^*$) may be determined by droop control loop. In some embodiments, the virtual inertia control loop output may include a phase angle ($\theta$) and the point of common coupling reference voltage ($V_{pcc}^*$). In some embodiments, the virtual inertia control loop output may be determined at least based on equations (1)-(4):

$$\bar{e} = \bar{v} + \bar{\imath}R + L_s \frac{d\bar{\imath}}{dt}, \tag{1}$$

$$P_{elect} = E_a i_a + E_b i_b + E_c i_c, \tag{2}$$

$$T_{elect} = \frac{P_{elect}}{\omega}, \tag{3}$$

$$T_{mech} = T_{elect} + B\omega + J\frac{d\omega}{dt}, \tag{4}$$

where $\bar{e}$ represents excitation voltage vector, $\bar{v}$ represents generated voltage vector, $\bar{\imath}$ represents armature current vector, R represents armature resistance, $L_s$ represents synchronous inductance, $P_{elect}$ represents electronic power, $T_{elect}$ represents electronic torque, $T_{mech}$ represents mechanical torque, $\omega$ represents the frequency, and J and B represent the inertia constants.

As shown in block 1040, the method 1000 for controlling one or more inverters may include determining a voltage loop output. As described above, in some embodiments, each of the one or more controllers may include a voltage control loop. In some embodiments, the voltage control loop may be configured to at least partially provide voltage magnitude control for an associated inverter of the one or more inverters.

As described above, in some embodiments, the voltage control loop input may be a point of common coupling reference voltage ($V_{pcc}^*$). In some embodiments, the voltage control loop output may include an inverter reference voltage (E*). In some embodiments, the inverter reference voltage (E*) may be determined at least in part by applying one or more control gains to the point of common coupling reference voltage ($V_{pcc}^*$). For example, the inverter reference voltage (E*) may be determined at least in part by applying one or more of a proportional gain ($k_p$), an integral gain ($k_i$), and/or a controller gain ($k_c$). Additionally or alternatively, the inverter reference voltage (E*) may be determined at least in part by applying the capacitor current ($I_c$) associated with each filter to the point common coupling reference voltage ($V_{pcc}^*$).

As described above, in some embodiments, the inverter reference voltage (E*) may be used to generate a switching signal for each transistor in an associated inverter of the one or more inverters. For example, the inverter reference voltage (E*) may be used to generate six switching signals ($S_1$-$S_6$) when the associated inverter of the one or more inverters 104 has six transistors. In some embodiments, the switching signals may be generated based at least in part on the sinusoidal pulse width modulation technique. For example, when the associated inverter of the one or more inverters has six transistors, each phase of the inverter reference voltage (E*) may be compared with a repeating triangular wave signal of a predetermined frequency to generate $S_1$, $S_3$, and $S_5$, and $S_2$ may be the conjugate of $S_1$, $S_4$ may be the conjugate of $S_2$, and $S_6$ may be the conjugate of $S_5$.

As described herein, the apparatus for controlling one or more inverters 100 may include one or more controllers 102 configured to provide droop control, voltage magnitude control, phase control, frequency control and/or inertia control to one or more inverters. In this regard, for example, each of the one or more controllers 102 may include a droop control loop configured to provide droop control for an associated inverter of the one or more inverters 104, a virtual inertia control loop configured to provide phase control, frequency control, and/or inertia control for an associated inverter of the one or more inverters 104, and voltage control loop configured to provide voltage magnitude control for an associated inverter of the one or more inverters 104. As a result, inverter based power supplies, such as those described herein, are able to sync with the power grid and/or other power supplies when the power supply is disconnected from the power grid and/or other power supplies and/or connected to a power supply to the power grid and/or other power supplies.

Example Computer Processing Device

Figure 11:
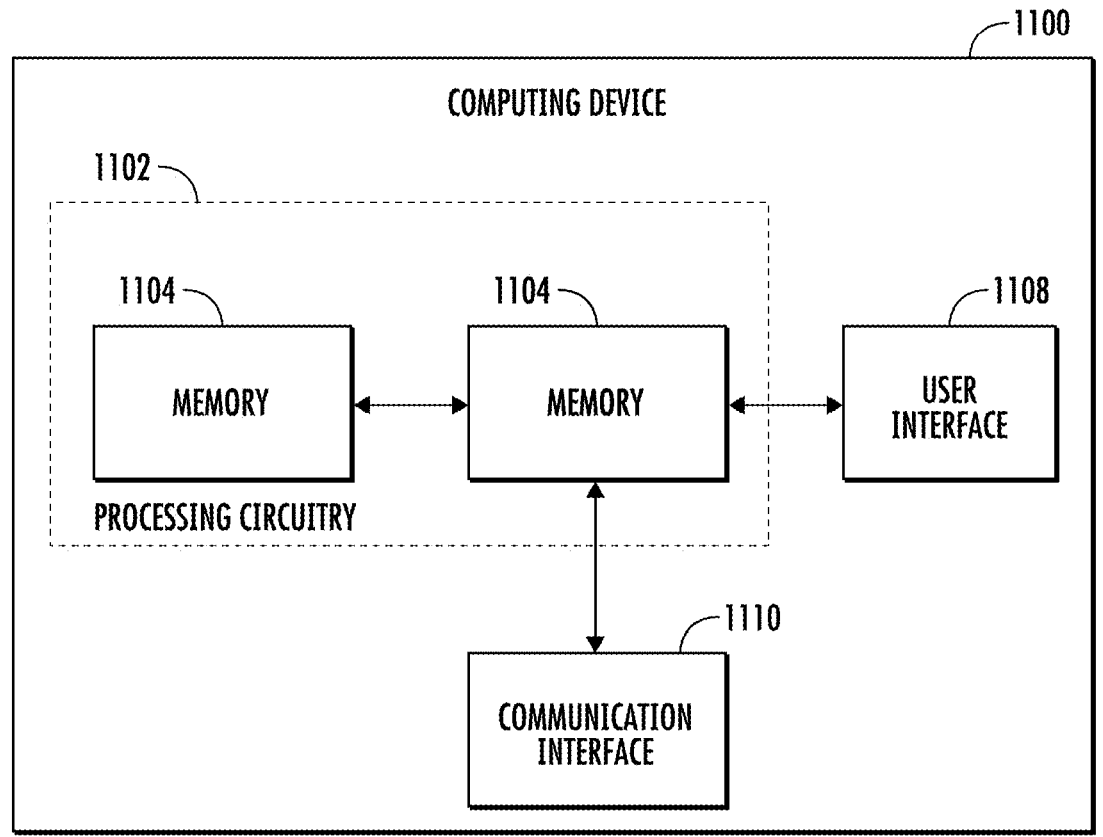
FIG. 11 illustrates a block diagram of an example computer processing device in accordance with one or more embodiments of the present disclosure.

With reference to FIG. 11, a block diagram of an example computer processing device 1100 is illustrated in accordance with some example embodiments. In some embodiments, each of the one or more controllers 102 may be embodied as one or more computer processing devices, such as the computer processing device 1100 in FIG. 11. However, it should be noted that the components, devices, or elements illustrated in and described with respect to FIG. 11 below may not be mandatory and thus one or more may be omitted in certain embodiments. Additionally, some embodiments may include further or different components, devices or elements beyond those illustrated in and described with respect to FIG. 11.

The computer processing device 1100 may include or otherwise be in communication with processing circuitry 1102 that is configurable to perform actions in accordance with one or more embodiments disclosed herein. In this regard, the processing circuitry 1102 may be configured to perform and/or control performance of one or more functionalities of the computer processing device 1100 in accordance with various embodiments, and thus may provide means for performing functionalities of the computer processing device 1100 in accordance with various embodiments. The processing circuitry 1102 may be configured to perform data processing, application execution and/or other processing and management services according to one or more embodiments. In some embodiments, the computer processing device 1100 or a portion(s) or component(s) thereof, such as the processing circuitry 1102, may be embodied as or comprise a chip or chip set. In other words, the computer processing device 1100 or the processing circuitry 1102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The computer processing device 1100 or the processing circuitry 1102 may therefore, in some cases, be configured to implement an embodiment of the disclosure on a single chip or as a single "system on a chip." As such, in some cases, a chip or chipset may constitute means for performing one or more operations for providing the functionalities described herein.

In some embodiments, the processing circuitry 1102 may include a processor 1106 and, in some embodiments, such as that illustrated in FIG. 11, may further include memory 1104. The processing circuitry 1102 may be in communication with or otherwise control a user interface 1108 and/or a communication interface 1110. As such, the processing circuitry 1102 may be embodied as a circuit chip (e.g., an integrated circuit chip) configured (e.g., with hardware, software or a combination of hardware and software) to perform operations described herein.

The processor 1106 may be embodied in a number of different ways. For example, the processor 1106 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 1106 may comprise a plurality of processors. The plurality of processors may be in operative communication with each other and may be collectively configured to perform one or more functionalities of the computer processing device 1100 as described herein. In some embodiments, the processor 1106 may be configured to execute instructions stored in the memory 1104 or otherwise accessible to the processor 1106. As such, whether configured by hardware or by a combination of hardware and software, the processor 1106 may represent an entity (e.g., physically embodied in circuitry—in the form of processing circuitry 1102) capable of performing operations according to embodiments of the present disclosure while configured accordingly. Thus, for example, when the processor 1106 is embodied as an ASIC, FPGA or the like, the processor 1106 may be specifically configured hardware for conducting the operations described herein. Alternatively, as another example, when the processor 1106 is embodied as an executor of software instructions, the instructions may specifically configure the processor 1106 to perform one or more operations described herein.

In some embodiments, the memory 1104 may include one or more non-transitory memory devices such as, for example, volatile and/or non-volatile memory that may be either fixed or removable. In this regard, the memory 1104 may comprise a non-transitory computer-readable storage medium. It will be appreciated that while the memory 1104 is illustrated as a single memory, the memory 1104 may comprise a plurality of memories. The memory 1104 may be configured to store information, data, applications, instructions and/or the like for enabling the computer processing device 1100 to carry out various functions in accordance with one or more embodiments. For example, the memory 1104 may be configured to buffer input data for processing by the processor 1106. Additionally or alternatively, the memory 1104 may be configured to store instructions for execution by the processor 1106. As yet another alternative, the memory 1104 may include one or more databases that may store a variety of files, contents or data sets. Among the contents of the memory 1104, applications may be stored for execution by the processor 1106 in order to carry out the functionality associated with each respective application. In some cases, the memory 1104 may be in communication with one or more of the processor 1106, user interface 1108, and/or communication interface 1110 via a bus(es) for passing information among components of the computer processing device 1100.

The user interface 1108 may be in communication with the processing circuitry 1102 to receive an indication of a user input at the user interface 1108 and/or to provide an audible, visual, mechanical or other output to the user. As such, the user interface 1108 may include, for example, a keyboard, a mouse, a joystick, a display, a touch screen display, a microphone, a speaker, and/or other input/output mechanisms. As such, the user interface 1108 may, in some embodiments, provide means for a user to access and interact with each of the one or more controllers 102.

The communication interface 1110 may include one or more interface mechanisms for enabling communication with other devices and/or networks. In some cases, the communication interface 1110 may be any means such as a device or circuitry embodied in either hardware, or a combination of hardware and software that is configured to receive and/or transmit data from/to a network and/or any other device or module in communication with the processing circuitry 1102. By way of example, the communication interface 1110 may be configured to enable each of the one or more controllers 102 to communicate other controllers/computing devices. Accordingly, the communication interface 1110 may, for example, include an antenna (or multiple antennas) and supporting hardware and/or software for enabling communications with a wireless communication network (e.g., a wireless local area network, cellular network, global positing system network, and/or the like) and/or a communication modem or other hardware/software for supporting communication via cable, digital subscriber line (DSL), universal serial bus (USB), Ethernet or other methods.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. An apparatus comprising:
a first controller, wherein:
the first controller is configured to provide voltage magnitude control for a first inverter,
the first controller comprises a voltage control loop, wherein the voltage control loop is associated with a voltage control loop input and a voltage control loop output, wherein the voltage control loop input comprises a point of common coupling reference voltage and the voltage control loop output comprises an inverter reference voltage, and
the first inverter is associated with a first power source.

2. The apparatus of claim 1, wherein the first controller is configured to provide droop control, phase control, frequency control, and inertia control for the first inverter.

3. The apparatus of claim 1, wherein the first controller comprises a virtual inertia control loop and a droop control loop.

4. The apparatus of claim 3, wherein the droop control loop is associated with a droop control loop input and a droop control loop output, wherein the droop control loop input comprises an active power and a reactive power and the droop control loop output comprises a point of common coupling reference voltage magnitude and a reference frequency.

5. The apparatus of claim 4, wherein the droop control loop comprises one or more droop coefficients.

6. The apparatus of claim 3, wherein the virtual inertia control loop is associated with a virtual inertia control loop input and a virtual inertia control loop output, wherein the virtual inertia control loop input comprises an active power and a reference frequency and the virtual inertia control loop output comprises a phase angle and the point of common coupling reference voltage.

7. The apparatus of claim 6, wherein the virtual inertia control loop comprises one or more inertia coefficients.

8. The apparatus of claim 1, further comprising:
a second controller configured to provide voltage magnitude control for a second inverter.

9. The apparatus of claim 8, further comprising:
one or more other controllers, wherein each of the one or more other controllers is configured to provide voltage magnitude control for an associated inverter of one or more other inverters.

10. The apparatus of claim 8, wherein the second controller comprises a second voltage control loop, wherein the second voltage control loop is associated with a second voltage control loop input and a second voltage control loop output, wherein the second voltage control loop input comprises a second point of common coupling reference voltage and the second voltage control loop output comprises a second inverter reference voltage.

11. The apparatus of claim 8, wherein the second controller is configured to provide droop control, phase control, frequency control, and inertia control for the second inverter.

12. The apparatus of claim 1, wherein the first controller comprises an active and reactive power control circuitry, wherein the active and reactive power control circuitry is configured to determine an active power and a reactive power associated with the first inverter.

13. A method comprising:
providing, using a first controller, voltage magnitude control for a first inverter, wherein the first controller comprises a voltage control loop, wherein the voltage control loop is associated with a voltage control loop input and a voltage control loop output, wherein the voltage control loop input comprises a point of common coupling reference voltage and the voltage control loop output comprises an inverter reference voltage, wherein the first inverter is associated with a first power source.

14. The method of claim 13, wherein the first controller is configured to provide droop control, phase control, frequency control, and inertia control for the first inverter.

15. The method of claim 13, wherein the first controller comprises a virtual inertia control loop and a droop control loop.

16. The method of claim 15, wherein the droop control loop is associated with a droop control loop input and a droop control loop output, wherein the droop control loop input comprises an active power and a reactive power and the droop control loop output comprises a point of common coupling reference voltage magnitude and a reference frequency.

17. The method of claim 15, wherein the virtual inertia control loop is associated with a virtual inertia control loop input and a virtual inertia control loop output, wherein the virtual inertia control loop input comprises an active power and a reference frequency and the virtual inertia control loop output comprises a phase angle and the point of common coupling reference voltage.

18. The method of claim 13, further comprising:
providing, using a second controller, voltage magnitude control for a second inverter.

19. The method of claim 18, wherein the second controller is configured to provide droop control, phase control, frequency control, and inertia control for the second inverter.

20. The method of claim 18, wherein the second controller comprises a second voltage control loop, wherein the second voltage control loop is associated with a second voltage control loop input and a second voltage control loop output, wherein the second voltage control loop input comprises a second point of common coupling reference voltage and the second voltage control loop output comprises a second inverter reference voltage.

\* \* \* \* \*